United States Patent
Sato et al.

(10) Patent No.: US 9,332,152 B2
(45) Date of Patent: May 3, 2016

(54) IMAGE PROCESSING APPARATUS, IMAGE PROCESSING METHOD, AND NON-TRANSITORY COMPUTER READABLE MEDIUM

(71) Applicant: FUJI XEROX CO., LTD., Tokyo (TW)

(72) Inventors: Hideki Sato, Kanagawa (JP); Terutake Hayashi, Kanagawa (JP); Kenichi Takahashi, Kanagawa (JP); Ryoko Saito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/615,752

(22) Filed: Feb. 6, 2015

(65) Prior Publication Data
US 2015/0271361 A1  Sep. 24, 2015

(30) Foreign Application Priority Data
Mar. 20, 2014 (JP) .................. 2014-059028

(51) Int. Cl.
| | |
|---|---|
| G06K 15/00 | (2006.01) |
| H04N 1/387 | (2006.01) |
| H04N 1/21 | (2006.01) |
| H04N 1/41 | (2006.01) |
| H04N 1/415 | (2006.01) |

(52) U.S. Cl.
CPC ........... *H04N 1/3877* (2013.01); *H04N 1/2104* (2013.01); *H04N 1/41* (2013.01); *H04N 1/415* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,219,454 | B1* | 4/2001 | Kawano et al. | 382/232 |
| 8,184,327 | B2* | 5/2012 | Sato | 358/1.16 |
| 2002/0018238 | A1* | 2/2002 | Hirano | G06K 15/02 |
| | | | | 358/1.16 |

FOREIGN PATENT DOCUMENTS

JP   H1075345 A   3/1998

OTHER PUBLICATIONS

Matsunoshita, Junichi JP 10075345 A (Mar. 1998).*

* cited by examiner

*Primary Examiner* — Huo Long Chen
*Assistant Examiner* — Neil R McLean
(74) *Attorney, Agent, or Firm* — Oliff PLC

(57) ABSTRACT

An image processing apparatus includes an input unit that receives data of an image, an encoding unit that encodes multiple data blocks respectively representing multiple partial images forming the image to generate multiple pieces of encoded information, a determining unit that determines a reading sequence of the data blocks with respect to each of multiple image rotation angles, and a memory that stores, in an associated form, multiple pieces of sequence information representing the determined sequences with respect to the image rotation angles, and the multiple pieces of generated encoded information.

6 Claims, 9 Drawing Sheets

FIG. 6

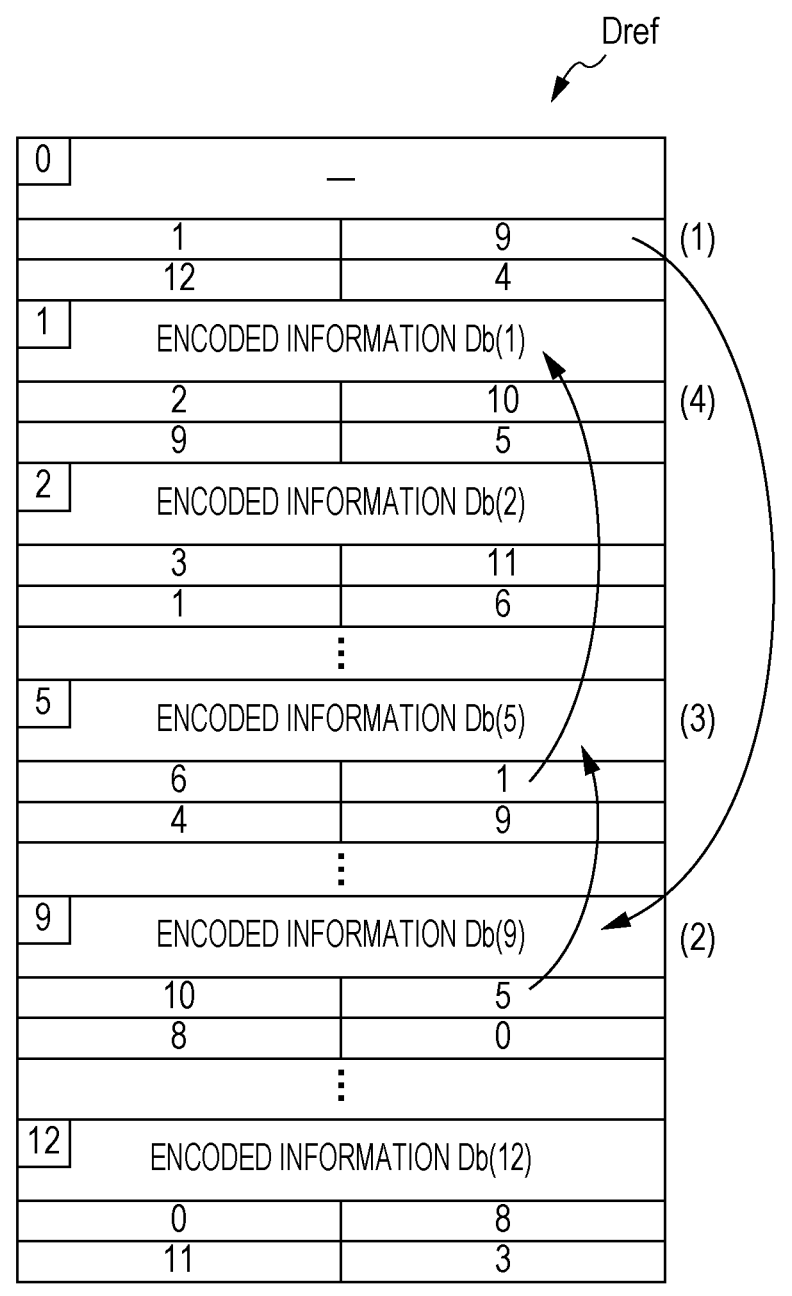

| | | Dref |
|---|---|---|
| 0 | — | |
| | 1 | 9 | (1)
| | 12 | 4 |
| 1 | ENCODED INFORMATION Db(1) | |
| | 2 | 10 | (4)
| | 9 | 5 |
| 2 | ENCODED INFORMATION Db(2) | |
| | 3 | 11 | |
| | 1 | 6 | |
| | ⋮ | | |
| 5 | ENCODED INFORMATION Db(5) | |
| | 6 | 1 | (3)
| | 4 | 9 | |
| | ⋮ | | |
| 9 | ENCODED INFORMATION Db(9) | (2)
| | 10 | 5 | |
| | 8 | 0 | |
| | ⋮ | | |
| 12 | ENCODED INFORMATION Db(12) | |
| | 0 | 8 | |
| | 11 | 3 | |

FIG. 9A

Dref1

FRONT OF ADDRESS

| HEADER INFORMATION (90 DEGREES) | | | | |
|---|---|---|---|---|
| 1 | Db (9) | 2 | Db (5) | SEQUENCE INFORMATION AT 90 DEGREES |
| 3 | Db (1) | 4 | Db (10) | |
| ... | ... | ... | ... | |
| 11 | Db (8) | 12 | Db (4) | |
| HEADER INFORMATION (180 DEGREES) | | | | |
| 1 | Db (12) | 2 | Db (11) | SEQUENCE INFORMATION AT 180 DEGREES |
| 3 | Db (10) | 4 | Db (9) | |
| ... | ... | ... | ... | |
| 11 | Db (2) | 12 | Db (1) | |
| HEADER INFORMATION (270 DEGREES) | | | | |
| 1 | Db (4) | 2 | Db (8) | SEQUENCE INFORMATION AT 270 DEGREES |
| 3 | Db (12) | 4 | Db (3) | |
| ... | ... | ... | ... | |
| 11 | Db (0) | 12 | Db (9) | |

BACK OF ADDRESS

FIG. 9B

Dref2

FRONT OF ADDRESS

| | |
|---|---|
| 1 | ENCODED INFORMATION Db(1) |
| 2 | ENCODED INFORMATION Db(2) |
| | ⋮ |
| N | ENCODED INFORMATION Db(N) |

BACK OF ADDRESS

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-059028 filed Mar. 20, 2014.

BACKGROUND (i) Technical Field

The present invention relates to an image processing apparatus, an image processing method, and a non-transitory computer readable medium.

(ii) Related Art

There are available image processing techniques that output an image with an orientation thereof rotated.

SUMMARY

According to an aspect of the invention, there is provided an image processing apparatus. The image processing apparatus includes an input unit that inputs data of an image, an encoding unit that encodes multiple data blocks respectively representing multiple partial images forming the image to generate multiple pieces of encoded information, a determining unit that determines a reading sequence of the data blocks with respect to each of multiple image rotation angles, and a memory that stores, in an associated form, multiple pieces of sequence information representing the determined sequences with respect to the image rotation angles, and the multiple pieces of generated encoded information.

BRIEF DESCRIPTION OF THE DRAWINGS

Exemplary embodiments of the present invention will be described in detail based on the following figures, wherein:

FIG. 6 illustrates an example of a value of the reference data;

FIGS. 9A and 9B illustrate another example of a generated data structure.

DETAILED DESCRIPTION

Figure 1:
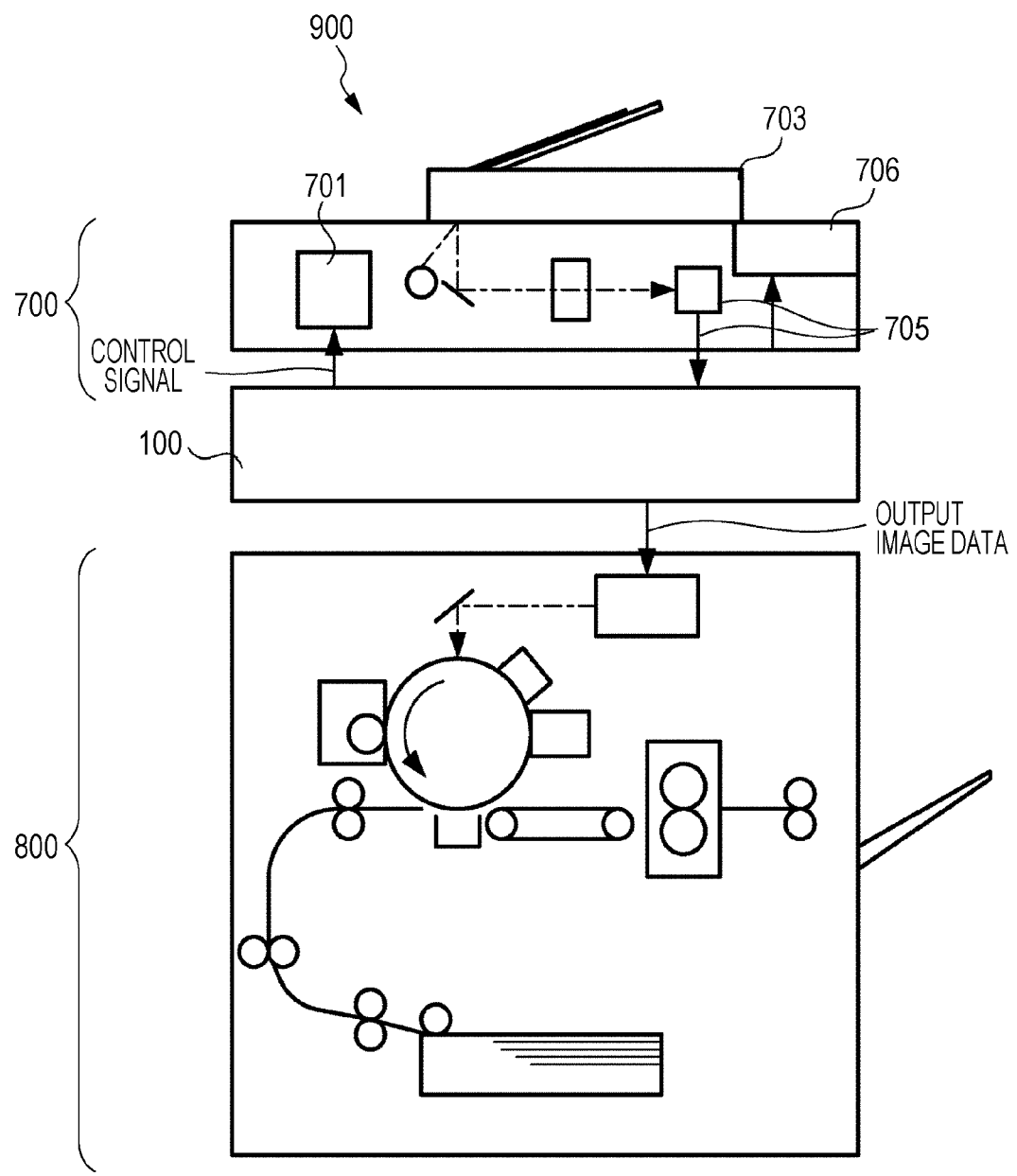
FIG. 1 generally illustrates an image forming apparatus.

FIG. 1 generally illustrates an image forming apparatus 900. The image forming apparatus 900 has a standard function of copying machine. The image forming apparatus 900 includes an image reading unit 700, an image processing unit 100, and an image forming unit 800.

The image reading unit 700 includes an automatic paper feeder 703, an image sensor 705, a reading controller 701, and an operation unit 706. When at least one sheet of documents is set as a reading target on the automatic paper feeder 703, the automatic paper feeder 703 successively feeds document sheets. The image sensor 705 optically reads the document supplied from the automatic paper feeder 703, and generates image data. The reading controller 701 is a processor that controls an image reading mechanism including the image sensor 705. The operation unit 706 is an input and output device, such as a touchpanel, and is operated by a user. The image processing unit 100 is supplied with control information of conditions and parameters related to document reading and outputting, and a read start command and an output start command, input from the operation unit 706. The control information specifies a rotation angle of an image to be output (as to whether the image is to be output at the same orientation as the original orientation with respect to the sheet having the formed image (namely, with a rotation angle 0) or with the angle changed with respect to the sheet). On the other hand, the image processing unit 100 supplies to the image reading unit 700 information related to an operation status of the image forming apparatus 900 and other information of the image forming apparatus 900 (captured contents, output contents, and a notification of normal or faulty operation). The operation unit 706 notifies the user of these pieces of information.

The image forming unit 800 includes a mechanism that holds and transports medium, such as paper sheets, a photoconductor drum, a developing device, a developer, and an exposure device. The image forming unit 800 forms an image on a paper sheet in response to image data output from the image processing unit 100.

The image processing unit 100 performs image processing on the image data input from the image reading unit 700, stores the processed image data, and supplies the image data to the image forming unit 800 as appropriate. The image processing includes encoding (compressing) or decoding (decompressing) an image, as well as correcting and modifying (reducing, expanding, or rotating) an image. The following discussion focuses on the encoding process (compressing process), the decoding process (decompression process), and the rotation process.

Figure 2:
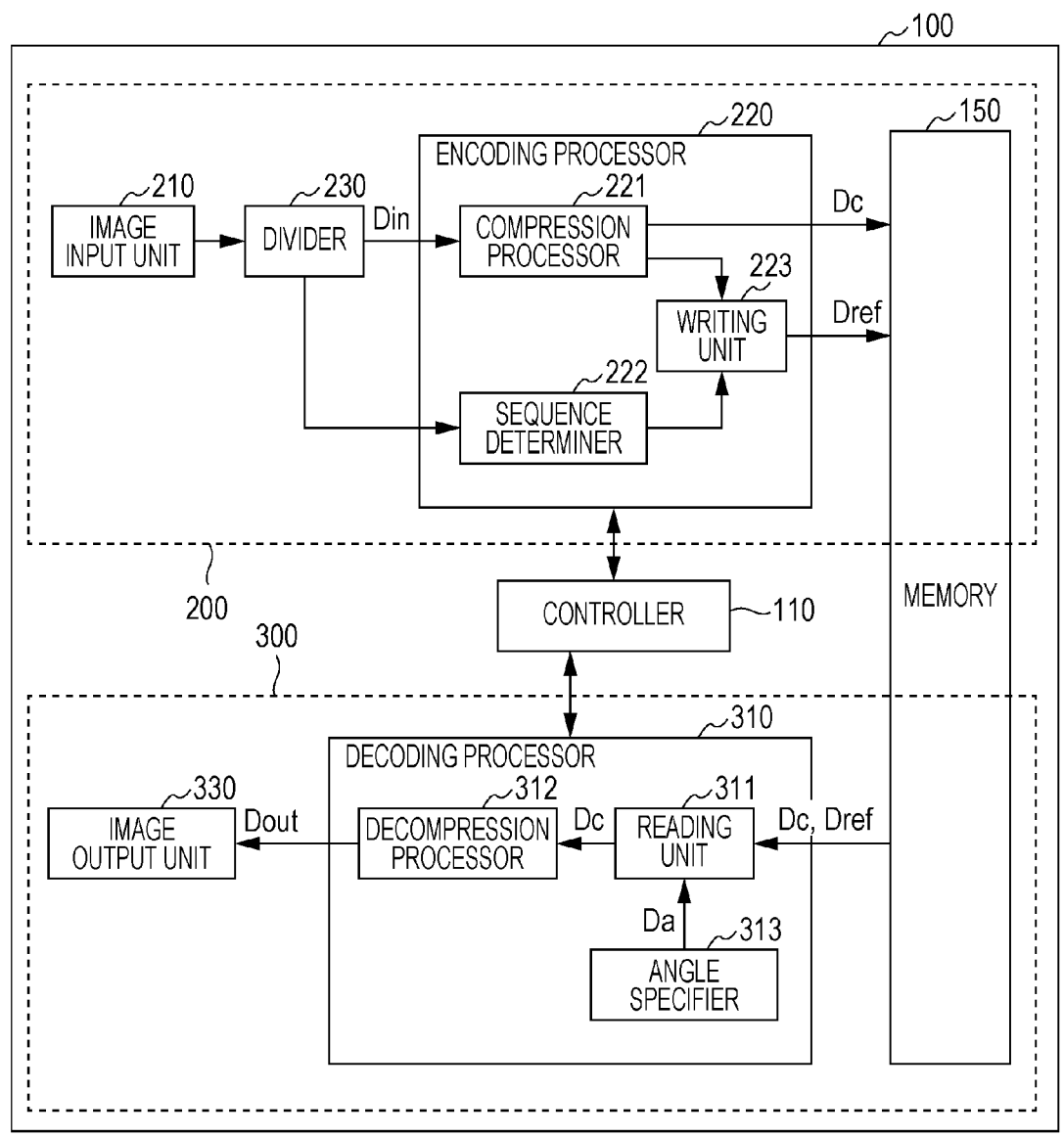
FIG. 2 is a functional block diagram of an image processing unit.

FIG. 2 is a functional block diagram of the image processing unit 100. The image processing unit 100 includes a controller 110, a memory 150, an encoding unit 200, and a decoding unit 300.

The controller 110 is implemented by a processor, and controls the encoding unit 200 and the decoding unit 300. The controller 110 also controls the image reading unit 700 and the image forming unit 800. The detailed discussion of the image reading unit 700 and the image forming unit 800 is omitted herein.

The memory 150 is implemented by a storage device and a memory controller. The storage device stores data in a volatile or non-volatile fashion, and is a random-access memory (RAM), a read-only memory (ROM), a semiconductor memory, or a hard disk. The memory 150 includes a memory region specified by a memory location (memory address). The memory 150 stores, at a specified memory location, compressed data Dc supplied by a compression processor 221, and reference data Dref supplied by a writing unit 223. The compressed data Dc and the reference data Dref stored on the memory 150 are read by a reading unit 311. The memory 150 stores a program that is to be executed by the controller 110, encoding processor 220, and decoding processor 310 and causes the image processing unit 100 to implement an image processing function to be discussed below. The program may be stored on a memory medium (not illustrated) and may be transferred to the memory 150 from the memory medium via an interface (not illustrated). Alternatively, the transferring of the program may be performed (downloaded) via a network rather than via the memory medium.

The encoding unit 200 includes an image input unit 210, an encoding processor 220, and a divider 230. The image input unit 210 is implemented by a signal input terminal, a cable, and the like, and transfers input image data Din generated by the image reading unit 700 to the divider 230.

The divider 230 is implemented by a general-purpose processor, a processor dedicated to signal processing, or a processing circuit. The divider 230 uses the memory 150 as a buffer as appropriate, and generates multiple data blocks Db from the input image data Din in accordance with a predetermined rule. Each data block Db represents a partial image that is obtained by dividing an image represented by the input image data Din. The divider 230 outputs to a sequence determiner 222 information representing parameters of division (the number of divided images, and the size of each data block Db).

The encoding processor 220 is implemented by a general-purpose processor, a processor dedicated to signal processing, or a processing circuit, and includes the compression processor 221, the sequence determiner 222, and the writing unit 223. The compression processor 221 compresses the input image data Din in accordance with a predetermined algorithm (such as joint photograph experts group (JPEG), graphics interchange format (GIF), or portable network graphic (PNG)) to generate the compressed data Dc. The generated compressed data Dc is transferred to the memory 150. Encoded information Ic of each piece of the compressed data Dc is also generated. The encoded information Ic includes an address within the memory 150 that stores a generated code (the compressed image data), the size of the code, an introduced error code, a parameter used in the encoding operation, information related to results of the encoding process, and information that is referenced when the decompression process is performed on the compressed data Dc.

In the following discussion, the term compression (decompression) is used in a broad sense and is intended to mean an encoding process (decoding process) performed on the image data, and is not directly related to a size reduction of the image data after the compression process.

The sequence determiner 222 determines a reading sequence of the data blocks Db with respect to each rotation angle when the compressed data Dc is output after being decompressed and rotated. In the exemplary embodiment, four rotation angles of 0 degrees, 90 degrees, 180 degrees, and 270 degrees are predetermined, and one is selected from the four rotation angles.

The writing unit 223 generates a piece of the reference data Dref of a piece of the input image data Din in accordance with sequence information Io supplied by the sequence determiner 222, and the encoded information Ic supplied by the compression processor 221, and writes the reference data Dref and the input image data Din in association with each other on the memory 150.

The decoding unit 300 includes a decoding processor 310 and an image output unit 330. The decoding processor 310 is implemented by a general-purpose processor, a processor dedicated to signal processing, or a processing circuit, and includes the reading unit 311, decompression processor 312, and angle specifier 313.

The angle specifier 313 reads angle information Da input from the operation unit 706, and transfers the angle information Da to the reading unit 311. The angle information Da indicates one of the four rotation angles of 0 degrees, 90 degrees, 180 degrees and 270 degrees specified by the user.

The reading unit 311 reads the reference data Dref from the memory 150, and identifies a data block Db as a process target in accordance with the reference data Dref and the angle information Da. The reading unit 311 reads from the memory 150 the compressed data Dc of the identified data block Db and transfers the compressed data Dc to the decompression processor 312.

The decompression processor 312 performs on the compressed data Dc supplied from the reading unit 311 a decompression process, corresponding to the algorithm of the predetermined compression process, and the rotation process. The decompression processor 312 uses the memory 150 as a buffer as appropriate, and concatenates multiple data blocks Db after the decompression process and rotation process to generate a piece of output image data Dout. The generated output image data Dout is output to the image output unit 330. The image output unit 330 transfers the output image data Dout from the decompression processor 312 to the image forming unit 800. Alternatively, the image output unit 330 may be implemented by a communication interface and an external memory medium, and may transfer the output image data Dout to another apparatus.

Referring to FIG. 3A through FIG. 3E, the relationship between a layout example of the data blocks Db and the rotation of an image.

Figure 3A:
FIGS. 3A through 3E illustrate a relationship of the location and rotation of data blocks.

FIG. 3A illustrates a setting example of the data blocks Db. As illustrated in FIG. 3A, an original image is divided by 4 in a horizontal scan direction and divided by 3 in a vertical scan direction, namely, divided into 12 regions in total. The number in each block identifies one data block Db from another. For example, the eighth block is labeled Db(8). The size of the data block Db is 64 pixels×64 pixels if the input image data Din is 256 pixels×192 pixels.

Figure 3B:
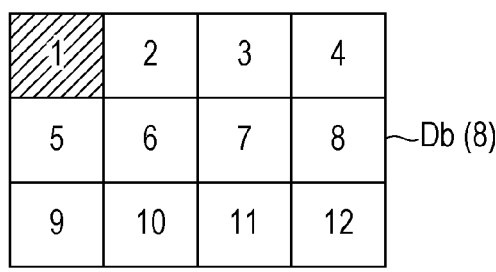
Figure 3C:
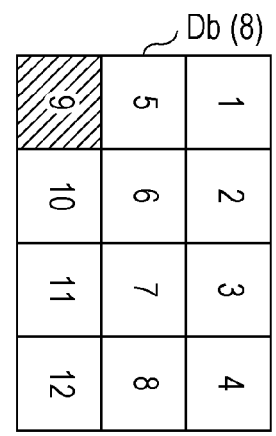
Figure 3D:
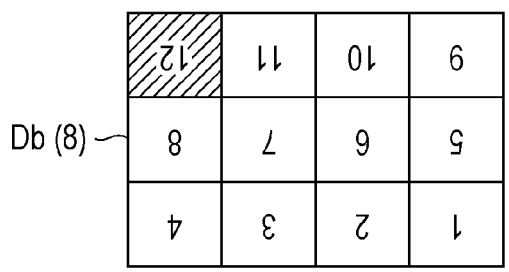
Figure 3E:
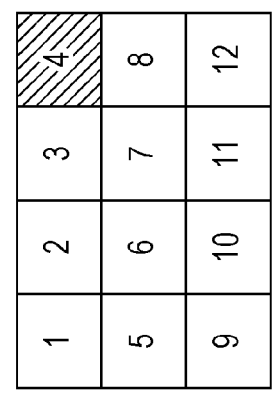

FIG. 3B through FIG. 3E illustrate the data blocks Db when the input image data Din is rotated (including the case of 0 degree rotation). As illustrated in FIG. 3B, the data blocks Db are output with no rotation. In such a case, the data blocks Db are read and stored in a predetermined rule (for example, from left to right and from top to bottom as follows: 1→2→3→4→5→6→7→8→9→10→11→12). If the data blocks Db are then read and concatenated in this sequence, a desired image is output. The image to be output is not different from the input image in terms of the orientation of the image with respect to the paper sheet.

In order to output a rotated image, the location of each data block Db on the paper sheet is to be changed. The reading sequence is modified in response to the change in the location of each data block Db. More specifically, if the rotation angle is 90 degrees, the data blocks Db are to be read in a sequence of 9→5→1→10→6→2→11→7→3→12→8→4. Similarly, if the rotation angle is 180 degrees, the data blocks Db are to be read in a sequence of 12→11→10→9→8→7→6→5→4→3→2→1. If the rotation angle is 270 degrees, the data blocks Db are to be read in a sequence of 4→8→12→3→7→11→2→6→10→1→5→9. The block that is to be read first is marked with hatching. The reference data Dref is generated during compression, and then stored. By referencing the reference data Dref during decompression, an image at a desired one of the four rotation angles is output.

Figure 4:
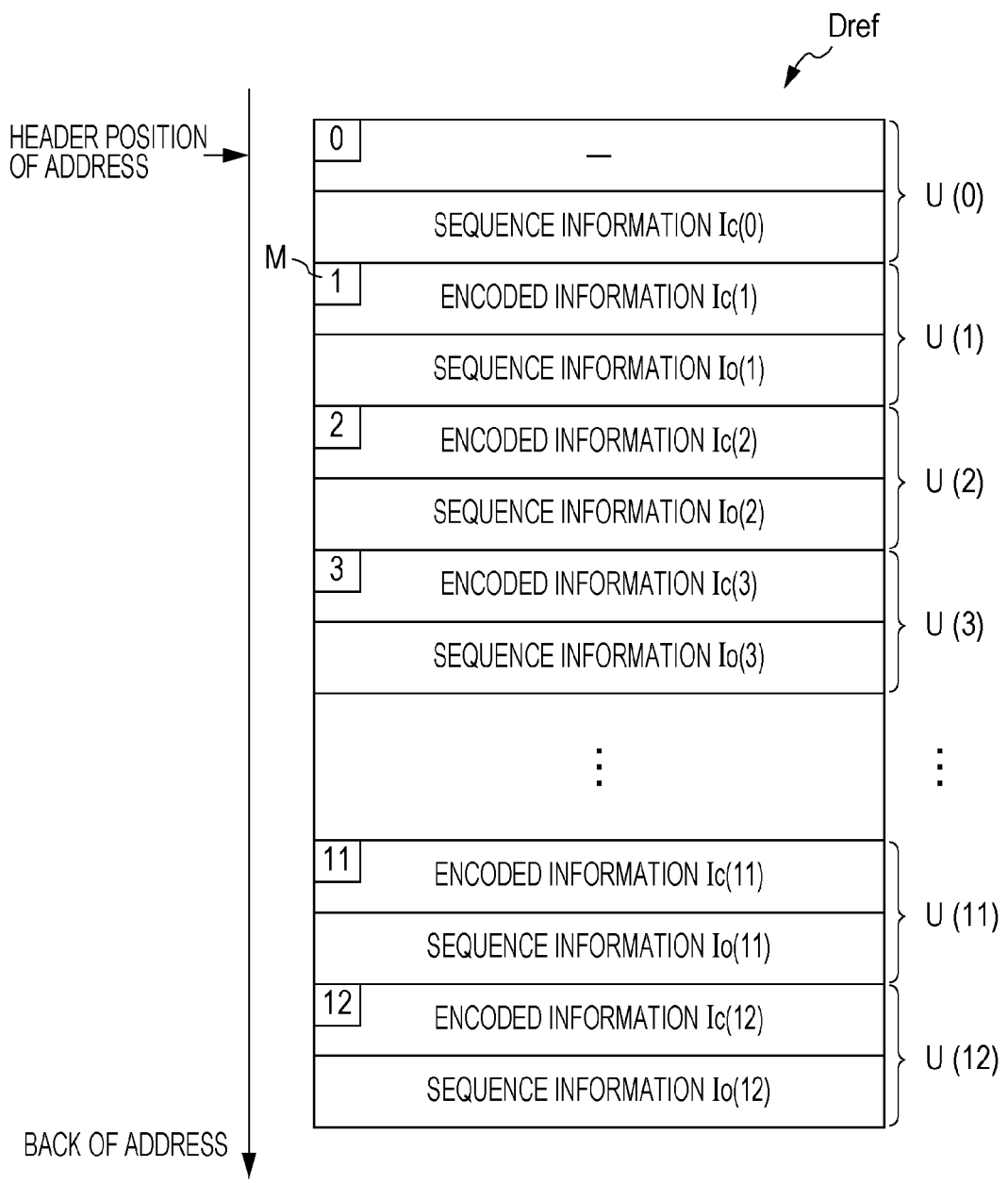
FIG. 4 illustrates a structure of reference data.

FIG. 4 illustrates the structure of the reference data Dref stored on the memory 150. The reference data Dref has a structure of concatenation of data units U of the number equal to the total number of data blocks Db (12 data blocks Db in this case). The data blocks DB respectively correspond to the data units. In the following discussion, the divider 230 assigns the data block number, and an n-th data block Db is designated as a data block Db(n). A first half of each data unit U(n) includes code information Ic(n) of the data block Db(n) and a second half of each data unit U(n) includes sequence information Io(n) associated with the data block Db(n). The encoded information Ic(n) includes marker information M at the header thereof, and the marker information M is used to determine a reading location within the reference data Dref.

Note that the header of the reference data Dref (data unit U(0)) includes no encoded information Ic(n), but the sequence information Io. The header is read first when the image is decompressed. The data units subsequent to the data unit U(0) are arranged in consecutive regions, but the access sequence to each data unit U(n) is different depending on the rotation angle.

Figure 5:
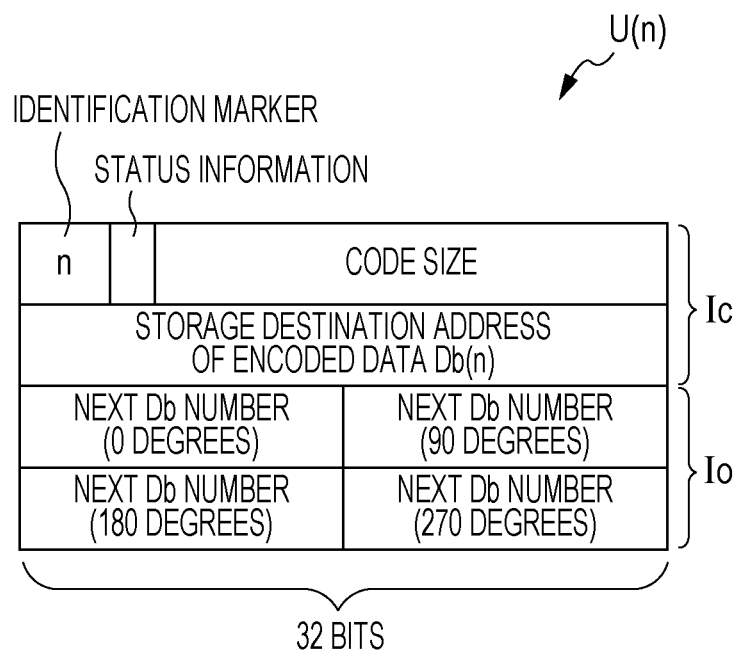
FIG. 5 illustrates a structure of a data unit forming the reference data.

FIG. 5 illustrates the structure of the data unit U in detail. The encoded information Ic has a size of 64 bits, and includes information identifying the data unit U, the size of code, an address including encoded data Db, and status information (inserted error code, and parameters related to encoding). The sequence information Io has a size of 64 bits, and is divided into four regions corresponding to the four rotation angles. Each region has a size of 16 bits, and the sequence corresponding to one rotation angle is described therewithin.

More specifically, a data block Db that is to be read subsequent to a current data block Db (namely, a target of the decompression process) is described in each region of the sequence information Io when the decompression process is to be performed with the rotation angle specified. For example, if an m-th process target is the data block Db(n), the decompression process is performed on the data block Db(n) by referencing the data unit U(n). One of the data blocks Db(1) through Db(12) serving as a process target (namely, a (m+1)-th process target) is described as the sequence information Io with respect to each of the rotation angles.

FIG. 6 illustrates an example of values of the reference data Dref generated for the data blocks of FIG. 3.

The data unit U(0) is read first when the reference data Dref is read. Since the encoded information Ic is not present in the data unit U(0), there is no data present as a decompression target. The sequence information Io of the data unit U(0) is read in succession. Since the value "9" is described at a rotation angle of 90 degrees, it is specified that the data unit U(9) is to be referenced next about the data block Db(9).

The reading unit 311 references the data unit U(9) and the encoded information Ic(9), thereby identifying decompressed data Dc(9). When the decompression and rotation processes are complete on the data unit U(9), the reading unit 311 references the sequence information Io of the data unit U(9). Since the value "5" is described at the rotation angle of 90 degrees, the data unit U(5) is determined to be referenced next. Using the reference data Dref, the decompression process and the rotation process are performed to the data blocks Db one by one and the next process target is identified. The value of "0" indicate that all data blocks Db of a single piece of Din are processed (with no next process target present). By tracking in this way, a sequence of start→9→5→1→10→6→2→11→7→3→12→8→4→end to output the image rotated by 90 degrees is correctly reproduced by the decoding unit 300. The same is true of the other rotation angles.

Figure 7:
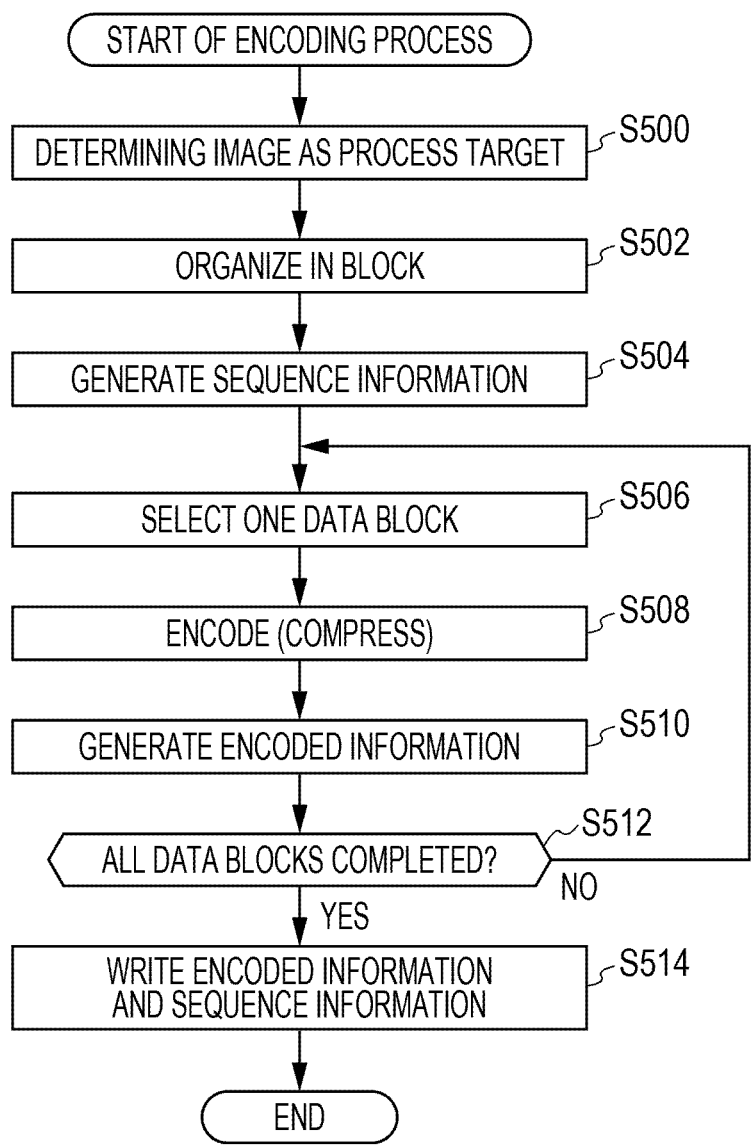
FIG. 7 is a flowchart of an encoding process.

FIG. 7 is a flowchart illustrating an encoding process. The user sets an original document as a process target (at least of a reading process of the image) on the automatic paper feeder 703, and enters a command to start the process via the operation unit 706 (step S500). The image input unit 210 acquires the input image data Din of the image, and generates the data blocks Db (step S502). The sequence determiner 222 generates the sequence information Io (step S504). The compression processor 221 selects the data blocks Db one piece by one piece in accordance with a predetermined rule (step S506), compresses the one selected data block Db to generate the compressed data Dc, and stores the compressed data Dc in association with the input image data Din on the memory 150 (step S508). The compression processor 221 generates the encoded information Ic of the data block Db compressed (step S510).

This process is performed on all the data blocks Db. When the sequence information Io and the encoded information Ic are acquired for all the data block Db (yes branch from step S512), the reference data Dref is generated using the acquired sequence information Io and encoded information Ic, and is stored in association with the input image data Din on the memory 150 (step S514).

Figure 8:
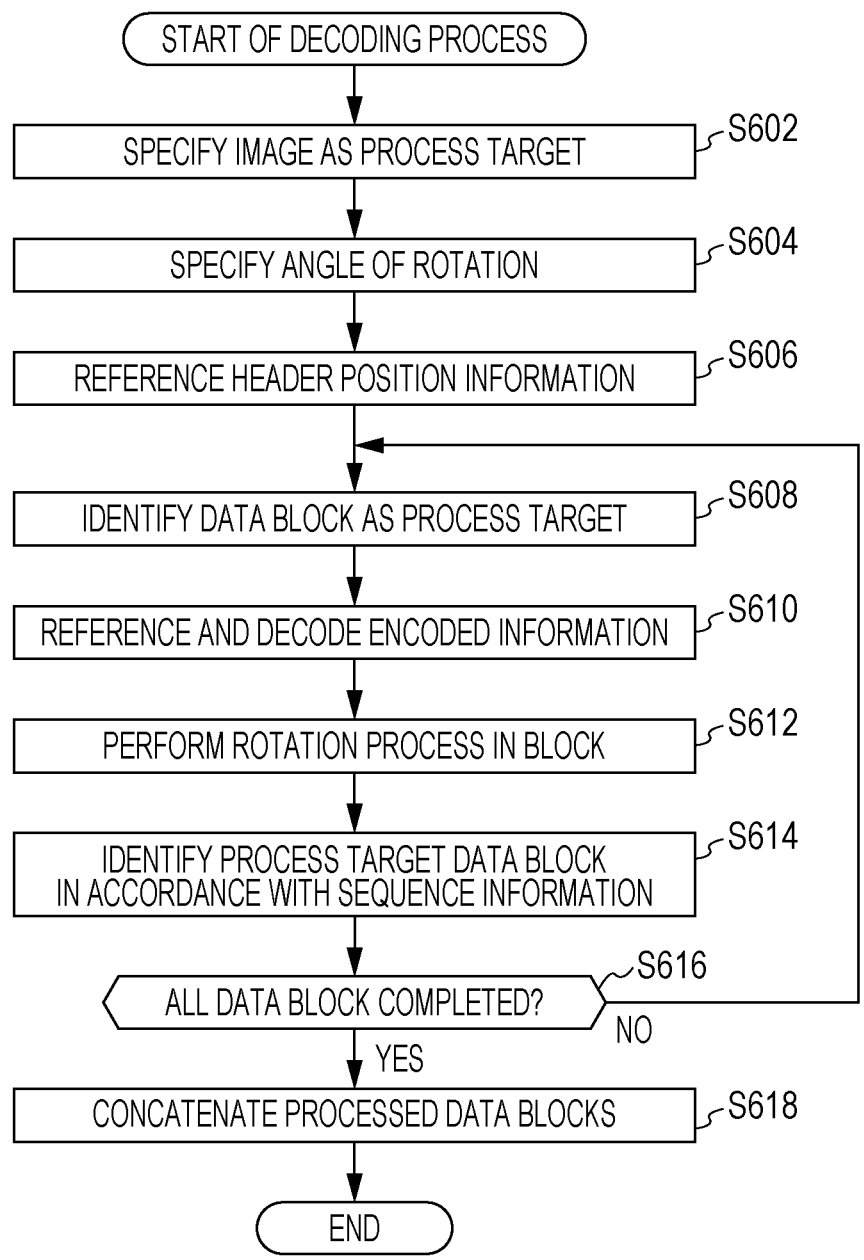
FIG. 8 is a flowchart of a decoding process.

FIG. 8 is a flowchart of a decoding process. The user specifies an image as a process target (step S602). The reading unit 311 identifies the reference data Dref associated with the image. If a command to read the image and a command to output (copy) the image are combined, step S602 is omitted. The user then enters a desired rotation angle (step S604). The reading unit 311 references header position information (step S606), and identifies (a data unit U of) a data block Db as a next process target corresponding to the entered rotation angle (step S608). The reading unit 311 performs the decompression process on the data block Db by referencing the encoded information Ic of the identified data block Db (step S610). The reading unit 311 performs the rotation process on the data block Db in response to the entered rotation angle (step S612).

The image data thus constructed based on the data blocks Db is buffered on the memory 150 as appropriate. A data block as a next process target is identified in accordance with the sequence information Io of the data unit U (step S614), and the process is repeated. When the decompression and rotation processes are complete on all the data blocks Db (yes branch from step S616), the buffered image data is concatenated to generate the output image data Dout (step S618).

In the exemplary embodiment, the storage of the image data encoded (compressed) is free from duplication. A memory capacity to store the rotation output of the image is smaller than when the same encoded (compressed) data is laid out on each of the rotation angles. This effect is more pronounced as the number of images captured at a time increases more. As a result, other information, such as the parameters related to image forming, for use in the image forming apparatus 900 may be additionally stored.

The exemplary embodiment has been described for exemplary purposes, and may be modified in view points as described below.

The number, size, shape, and layout of data blocks have been descried for exemplary purposes. As long as the encoded information to be decompressed is not stored in a duplicate fashion, the reference data Dref in a structure different from the structures illustrated in FIG. 4 through FIG. 6 may also be used. For example, the number of data blocks Db identified as a process target may not necessarily be one. More specifically, a next process target, and another process target after the next may also be described in the reference data Dref. Alternatively, information specifying the sequence of all the data blocks may be described.

The sequence information specifying the sequence of the data blocks and the encoded information may be separated and then separately stored on consecutive memory regions. More specifically, as illustrated in FIG. 9A and FIG. 9B, reference data Dref1 and reference data Dref2 may be generated instead of the reference data Dref, and stored on separate memory regions. The reference data Dref1 corresponds to the sequence information Io of all the data blocks Db, and the reference data Dref2 corresponds to the encoded information Ic of all the data blocks Db. On each rotation angle, the reference data Dref1 includes a header at the front end thereof (defining the structure of data stored on the memory regions subsequent to the header) and a data body describing the data block numbers of the data block Db as a process target from the first through the last data block (twelfth data block in this case). The reading unit 311 determines a process sequence by referencing the reference data Dref1, and performs the decompression and rotation processes by successively extracting the encoded information Ic corresponding to the determined data block Db, one piece by one piece, by referencing the reference data Dref2. The decoding unit 300 may have a function of deleting the sequence information Io related to an angle not specified by the reading unit 311. This arrangement makes memory efficiently available for some other operation.

An image processing apparatus of the exemplary embodiment thus includes an input unit that inputs data of an image, an encoding unit that encodes multiple data blocks respectively representing multiple partial images forming the image to generate multiple pieces of encoded information, a determining unit that determines a reading sequence of the data blocks with respect to each of multiple image rotation angles, and a memory that stores, in an associated form, multiple pieces of sequence information representing the determined sequences with respect to the image rotation angles, and the multiple pieces of generated encoded information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   an input unit that inputs data of an image;
   an encoding unit that encodes a plurality of data blocks respectively representing a plurality of partial images forming the image to generate a plurality of pieces of encoded information;
   a determining unit that determines a reading sequence of the data blocks with respect to each of a plurality of image rotation angles; and
   a memory that buffers the data of the image and stores, in an associated form, a plurality of pieces of sequence information representing the determined sequences with respect to the image rotation angles, and the plurality of pieces of generated encoded information;
   wherein a piece of the sequence information with respect to an image rotation angle of interest is stored in consecutive memory regions,
   wherein the image processing apparatus comprises a deletion unit that deletes the sequence information with respect to image rotation angles other than the image rotation angle of interest, and
   wherein the buffered data of the image is concatenated to generate output image data.

2. The image processing apparatus according to claim 1, wherein a piece of the encoded information is associated with the piece of the sequence information, and
   wherein the piece of the sequence information specifies the encoded information that is to be read next with respect to each of the image rotation angles.

3. The image processing apparatus according to claim 1, further comprising:
   a receiving unit that receives a designation of the image rotation angle; and
   a decoding unit that decodes the encoded information in accordance with the received designation of the image rotation angle.

4. The image processing apparatus according to claim 2, further comprising:
   a receiving unit that receives a designation of the image rotation angle; and
   a decoding unit that decodes the encoded information in accordance with the received designation of the image rotation angle.

5. An image processing method comprising:
   receiving data of an image;
   encoding a plurality of data blocks respectively representing a plurality of partial images forming the image to generate a plurality of pieces of encoded information;
   determining a reading sequence of the data blocks with respect to each of a plurality of image rotation angles;
   buffering the data of the image and storing, in an associated form, a plurality of sequence information representing the determined sequences with respect to the image rotation angles, and the plurality of pieces of generated encoded information;
   storing a piece of the sequence information with respect to an image rotation angle of interest in consecutive memory regions;
   deleting the sequence information with respect to image rotation angles other than the image rotation angle of interest; and
   concatenating the buffered data of the image to generate output image data.

6. A non-transitory computer readable medium storing a program causing a computer to execute a process for processing an image, the process comprising:
   receiving data of an image;
   encoding a plurality of data blocks respectively representing a plurality of partial images forming the image to generate a plurality of pieces of encoded information;
   determining a reading sequence of the data blocks with respect to each of a plurality of image rotation angles;
   buffering the data of the image and storing, in an associated form, a plurality of sequence information representing the determined sequences with respect to the image rotation angles, and the plurality of pieces of generated encoded information;
   storing a piece of the sequence information with respect to an image rotation angle of interest in consecutive memory regions;
   deleting the sequence information with respect to image rotation angles other than the image rotation angle of interest; and
   concatenating the buffered data of the image to generate output image data.

* * * * *